US009536015B1

(12) United States Patent
Kulick et al.

(10) Patent No.: US 9,536,015 B1
(45) Date of Patent: Jan. 3, 2017

(54) USING SOCIAL NETWORKING INFORMATION

(75) Inventors: Matthew E. Kulick, San Francisco, CA (US); Anandsudhakar Kesari, Santa Clara, CA (US); Sumitro Samaddar, Cupertino, CA (US); Jinan Lou, Cupertino, CA (US); Maureen Heymans, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 595 days.

(21) Appl. No.: 13/604,874

(22) Filed: Sep. 6, 2012

Related U.S. Application Data

(60) Provisional application No. 61/531,242, filed on Sep. 6, 2011.

(51) Int. Cl.
*G06F 17/30* (2006.01)
(52) U.S. Cl.
CPC ... *G06F 17/30958* (2013.01); *G06F 17/30864* (2013.01)
(58) Field of Classification Search
CPC ............... G06Q 50/01; G06F 17/30528; G06F 17/30699; G06F 17/30702; G06F 17/30861
See application file for complete search history.

(56) References Cited

U.S. PATENT DOCUMENTS

| 8,095,432 | B1* | 1/2012 | Berman et al. | 705/26.7 |
|---|---|---|---|---|
| 8,572,129 | B1* | 10/2013 | Lee et al. | 707/798 |
| 8,606,721 | B1* | 12/2013 | Dicker | 705/319 |
| 2006/0053194 | A1* | 3/2006 | Schneider et al. | 709/204 |
| 2010/0057858 | A1* | 3/2010 | Shen et al. | 709/206 |
| 2010/0138414 | A1* | 6/2010 | Newman et al. | 707/735 |
| 2010/0312820 | A1* | 12/2010 | Goffinet et al. | 709/203 |
| 2011/0208814 | A1* | 8/2011 | Bostrom et al. | 709/204 |
| 2011/0246574 | A1* | 10/2011 | Lento et al. | 709/204 |
| 2011/0276631 | A1* | 11/2011 | Schmitt | 709/205 |
| 2012/0005224 | A1* | 1/2012 | Ahrens et al. | 707/769 |
| 2012/0158935 | A1* | 6/2012 | Kishimoto et al. | 709/223 |
| 2012/0197750 | A1* | 8/2012 | Batra et al. | 705/26.7 |
| 2012/0271722 | A1* | 10/2012 | Juan et al. | 705/14.72 |
| 2013/0054708 | A1* | 2/2013 | Bhatt et al. | 709/206 |

OTHER PUBLICATIONS

"Suggesting Friends Using the Implicit Social Graph," by Roth et al. IN: KDD'10 (Jul. 25-28, 2010). Available at: ACM.*

(Continued)

*Primary Examiner* — Hung Q Pham
(74) *Attorney, Agent, or Firm* — Fish & Richardson P.C.

(57) ABSTRACT

Techniques for using social networking information may include making a determination that content authored by a first party references a second party more than a specified number of times. An adjustment in affinity may be made between the first party and the second party in the social network in response to the determination. Making the adjustment in affinity may include modifying a social graph of at least the first party that is referenced by the social network in order to reflect the adjustment in affinity. Modifying the social graph includes creating a closer connection between the first party and the second party than had existed prior to the determination. In response to the adjustment in the affinity, promotion is adjusted, to the first party, of content in the social network that has a connection to the second party.

17 Claims, 10 Drawing Sheets

(56) References Cited

OTHER PUBLICATIONS

"User Interactions in Social Networks and Their Implications," by Wilson et al. IN: EuroSys'09 (2009). Available at: ACM.*
U.S. Appl. No. 11/935,791, filed Nov. 6, 2007.
U.S. Appl. No. 12/898,608, filed Oct. 5, 2010.
U.S. Appl. No. 61/383,696, filed Sep. 16, 2010.
U.S. Appl. No. 13/482,525, filed May 29, 2012.
U.S. Appl. No. 61/491,600, filed May 31, 2011.
U.S. Appl. No. 13/419,606, filed Mar. 14, 2012.
U.S. Appl. No. 61/452,677, filed Mar. 15, 2011.
U.S. Appl. No. 12/909,809, filed Oct. 21, 2010.
U.S. Appl. No. 61/253,831, filed Oct. 21, 2009.
U.S. Appl. No. 12/756,072, filed Apr. 7, 2010.
U.S. Appl. No. 61/302,534, filed Feb. 8, 2010.
U.S. Appl. No. 12/900,901, filed Oct. 8, 2010.
U.S. Appl. No. 13/314,773, filed Dec. 8, 2011.
U.S. Appl. No. 13/563,318, filed Jul. 31, 2012.

* cited by examiner

USING SOCIAL NETWORKING INFORMATION

CROSS-REFERENCE TO RELATED APPLICATION

Priority is hereby claimed to U.S. Provisional Application No. 61/531,242, which was filed on Sep. 6, 2011. The contents of U.S. Provisional Application No. 61/531,242 are hereby incorporated by reference into this disclosure.

BACKGROUND

This specification relates generally to using social networking information.

Search engines identify resources (e.g., images, audio, video, Web pages, text, documents) that are relevant to a user's needs and present information about the resources in a manner that is useful to the user. For example, a search engine returns a set of search results in response to a user submitted query.

A user may give more weight to search results that are associated with reviews, opinions, or other content associated with a user's social graph (e.g., contacts of the user). A user's social graph can be based, in part, on social networks to which the user subscribes.

Social networks permit users to post information about themselves and to communicate with other people, e.g., their contacts, family, and co-workers. Some social networks permit users to specify friendships with other users. Additionally, social network users may write descriptions of their interests and disinterests (e.g., what they like or don't like), compose stories, describe their lives, etc. Some users may generate a great amount of content, while other users may generate little or no content.

SUMMARY

Example techniques for using social networking information may include making a determination that content authored by a first party references a second party more than a specified number of times, where the first party and the second party both subscribe to a social network. An adjustment in affinity may be made between the first party and the second party in the social network in response to the determination. Making the adjustment in affinity may include modifying a social graph of at least the first party that is referenced by the social network in order to reflect the adjustment in affinity. Modifying the social graph includes changing one or more attributes of one or more edges in the social graph of at least the first party to create, in the social graph, a closer connection between the first party and the second party than had existed prior to the determination. In response to the adjustment in the affinity, promotion is adjusted, to the first party, of content in the social network that has a connection to the second party. The example techniques may include one or more of the following example features, either alone or in combination.

The foregoing operations may include promoting connection of the first party to the second party in a second social network by suggesting that a connection of the first party to the second party be established in the second social network. The content having a connection to the second party may include content from a social networking account of the second party. Adjusting promotion of content may include, in response to a search query provided by the first party, ranking search results associated with the content from the social networking account of the second party as having more relevance than search results not associated with the content from the social networking account of the second party.

The foregoing operations may include identifying a relationship between the first party and the second party based on one or more connections in the social graph. Making the adjustment in affinity may include changing a weight on one or more edges of the social graph of at least the first party. Making the adjustment in affinity may include adding one or more edges to the social graph of at least the first party, where the one or more edges are between the first party and the second party. Identifying the relationship may include identifying that the first party is connected to the second party by a first social network, and that the first party and the second party are both members of a second social network, but not connected by the second social network. A connection of the first party to the second party may be promoted on the second social network.

The foregoing operations may include verifying that the second party is authentic prior to adjusting promotion. Verifying that the second party is authentic may include identifying contacts that the first party and the second party have in common. The second party may be deemed authentic if a number of the contacts exceeds a threshold. Verifying that the second party is authentic may include identifying reciprocal connections among accounts of the second party on different social networks.

The adjustment in affinity may be made also based on a determination that the first party and the second party have a common interest based on interaction of the first party and of the second party with same online content.

Advantages of the foregoing techniques may include providing users with opportunities for information and/or social connects based on their online interactions. Such opportunities might otherwise have been unknown to the users.

All or part of the systems and techniques described herein may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein are techniques for using social networking information. The techniques include, e.g., recognizing relationships between users in a social networks, recognizing references made between such users, and recognizing common interests among such users. The techniques may use the resulting information to promote an affinity among users of social networks, and to promote content to users of the social networks. The techniques may be implemented in an appropriate network system, with appropriate devices and computing equipment. An example of such an environment is described below.

Figure 1:
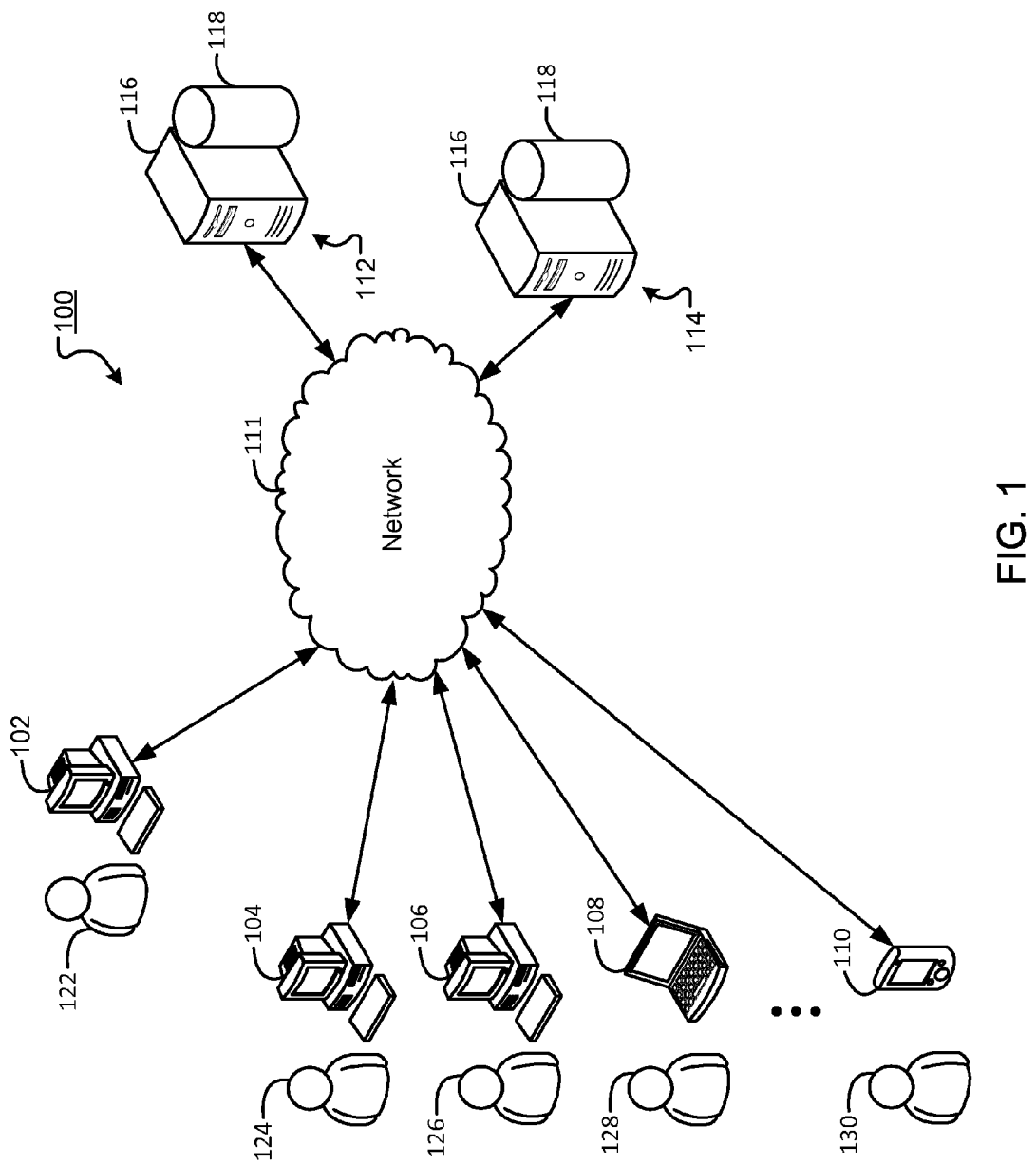
FIG. 1 is a block diagram showing an example of a network environment on which the process described herein may be implemented.

FIG. 1 is a block diagram showing an example of a network environment on which the process described herein may be implemented. FIG. 1 shows an example network environment 100. The network environment 100 includes computing devices 102, 104, 106, 108, 110 that can each communicate with a first server system 112 and/or a second server system 114 over a network 111. Each of computing devices 102, 104, 106, 108, 110 has a respective user 122, 124, 126, 128, 130 associated therewith. Each of the first and second server systems 112, 114 includes a computing device 116 and a machine-readable repository, or database 118. Example environment 100 may include many thousands of Web sites, computing devices and servers, which are not shown.

The network 111 can include a large computer network, examples of which include a local area network (LAN), wide area network (WAN), the Internet, a cellular network, or a combination thereof connecting a number of mobile computing devices, fixed computing devices, and server systems. The network(s) may provide for communications under various modes or protocols, examples of which include Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Computing devices 102 to 110 enable respective users 122 to 130 to access and to view documents, e.g., Web pages included in Web sites. For example, user 122 of computing device 102 can view a Web page using a Web browser. The Web page can be provided to computing device(s) 102 to 110 by server system 112, server system 114 or another server system (not shown). In example environment 100, computing devices 102, 104, 106 are illustrated as desktop-type computing devices, computing device 108 is illustrated as a laptop-type computing device 108, and computing device 110 is illustrated as a mobile computing device. It is appreciated, however, that computing devices 102 to 110 can each include a type of computing device, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 2:
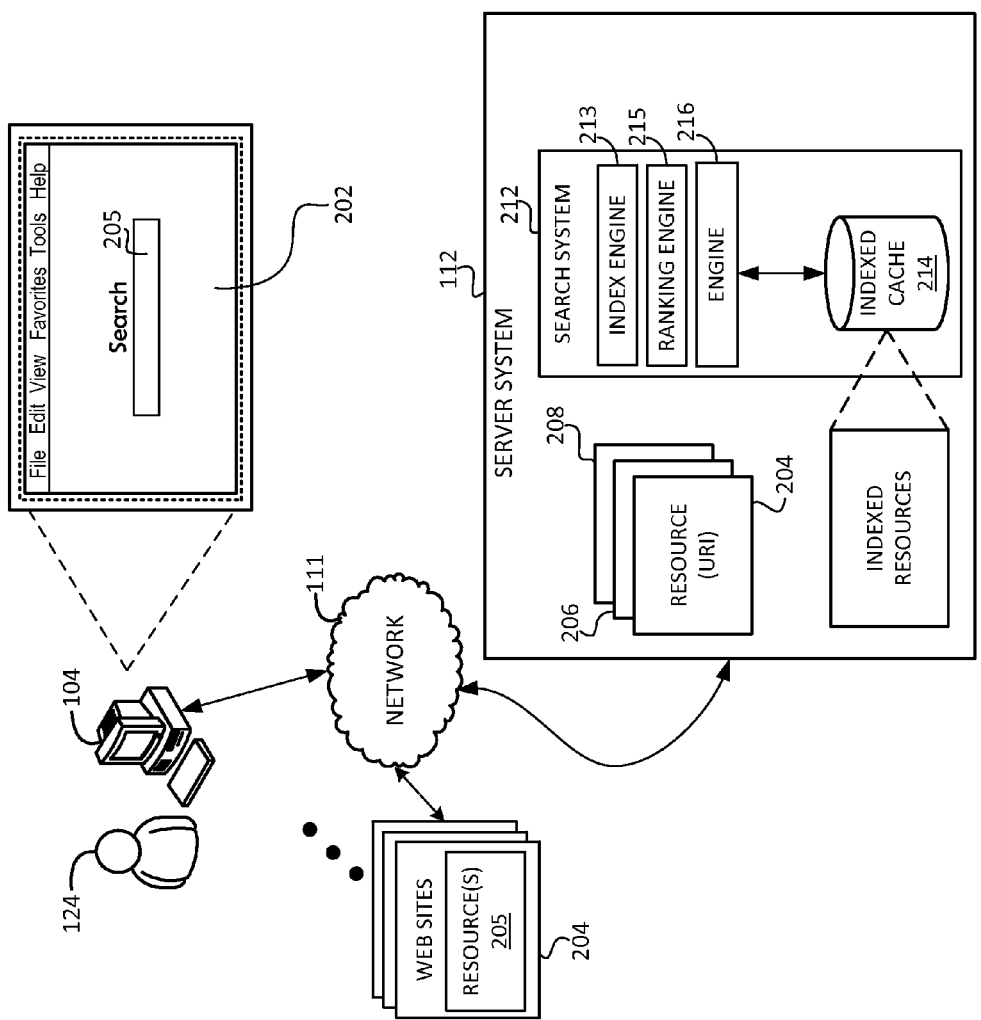
FIG. 2 is a block diagram of an example part of the network environment of FIG. 1.

FIG. 2 is a block diagram of an example part of the network environment of FIG. 1. In this regard, FIG. 2 shows portion 200 of example network environment 100. In FIG. 2, computing device 104 communicates with server system 112 to display a Web page 202 of a Website. Specifically, server system 112 stores a plurality of resources 204, 206, 208, each having an associated resource identifier (Resource ID). For example, the resource 204, 206, 208 can each correspond to different Web pages of the same Web site, or can correspond to Web pages of different Web sites.

To view a Web page, user 124 can input or select a Resource ID using a browser that is executed on computing device 104. The Resource ID can include, for example, a uniform resource indicator (URI) and a uniform resource locator (URL). A request including the Resource ID is transmitted from computing device 104 to server system 112 over network 111. In response, the server system identifies the requested resource based on the Resource ID, and transmits the resource to computing device 104 over network 111. For example, the resource may be a Web page, through which a user may access a search system. The Web page may include a field 205 for inputting search terms that are transmitted to the search system. In response, the search system performs a search of an indexed cache, and returns a search results list to a user. The search results list may include, e.g., links to content that is relevant to the search terms.

Referring to FIG. 2, network environment 100 includes a search system 212 that identifies resources 205 by crawling and indexing resources provided by content publishers on Web sites 204. In this regard, search system 212 may include an indexing engine 213 that indexes resources (e.g., Web pages, images, or news articles on the Internet), an index cache 214 that stores the index information, and a ranking engine 215 (or other software) to rank the resources that match the query. Social graph information, including that described herein, can in be included in a same index as other resources or in a separate index (not shown). Search system 212 may be implemented, e.g., on server system 214 as shown or on other appropriate hardware.

In response to a search query, search system 212 can access indexed cache 214 to identify resources 205 that are relevant to the search query. Search system 212 identifies resources 205 in the form of search results and returns the search results to a requesting device in search results pages. A search result may be data generated by search system 212 that identifies a resource 205, and that includes a link to the corresponding resource. An example search result can include a Web page title, a snippet of text or a portion of an image extracted from the Web page, and the URL (Unified Resource Location) of the Web page.

Search system 212 takes into account social affinities that the user has to others when obtaining and presenting search results to the user. For example, a user's affinity to another party may be used to change (either increase or decrease) the ranking of future search results related to that party. Such affinities may also be used to promote online connection between the party and other parties, e.g., through social networks. In this regard, a party may include a person, but may also include, e.g., a company, service, or other entity to which a connection may be made.

In a social networking context, affinity can identify the closeness of a party to a user. For example, a contact of a contact who has five common middle contacts with the user has more of an affinity with the user (e.g., is considered closer to the user) than a contact of a contact who has only one common middle contact. Factors in determining affinity can include, e.g.: how a contact is connected to the user (e.g., a source of a connection), which social networking site the contact is a member of, whether contact or contact of contact, and how many paths to get to the contact of a contact (e.g., common middle contacts).

Affinity can also be based on the user's interactions with members of the social graph (e.g., the frequency of interaction, the type of interaction, and so forth). For example, a user that frequently clicks on posts by a particular contact can be considered to be closer to that contact than with other contacts where they click on respective posts less frequently. Likewise, if a user frequently "mouses-over" content by an author (e.g., a search result link), but does not select that content, the degree of affinity may be less than if the link is selected. Similarly, an amount of time viewing content may be an indicator that one party likes content from another party. The amount of time viewing particular content may be an indication that one party likes only that particular type of content from the other party.

In other examples, affinity can be defined by indirect interaction between users. For example, if two users interact with the same content regularly or frequently, those two users may be considered to have an affinity with each other. In still other examples, if two users interact with the same people regularly or frequently, those two users may be considered to have an affinity with each other.

Affinity can also be greater for particular types of interactions, for example, comments on a contact's posts can result in a closer social connection than occasional endorsements. Affinity can change over time. For example, as the types or frequency of interactions change with members of the social graph, the resulting affinities can change as well.

Users can designate particular resources as endorsed, share resources, quote URLs, or otherwise indicate an interest or liking of content, examples of which include a particular resource, Web page, or search result. For example, an application, widget, or scripting can be provided in search results pages, Web pages, or within a browser application that allows a user to indicate liking, sharing, or other evaluation of an associated resource or search result. The user can mark the particular resource, Web site, or search results to indicate endorsement or other evaluation (e.g., through a browser control or user interface element presented with the associated content).

A social graph is one way to represent connection between two parties, which may, or may not, be on the same social network. A social graph is an association of connections among users and content, which may be depicted graphically. Types of connections in social graphs can include, but are not limited to, other users to which a user is in direct contact (e.g., user mail or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph can include connections within a single network or across multiple networks.

Distinct social graphs can be generated for different types of connections. For example, a user can be connected with chat contacts in one social graph, email contacts in a second social graph, and connections from a particular social network in a third social graph. Each social graph can include edges to additional parties at greater degrees of separation from the user. For example, an email contact can have its own email contacts to others adding a degree of separation from the user (e.g., user→email contact→contact of email contact). These contacts can, in turn, can have additional contacts at another degree of separation from the user. Similarly, a party's connection to someone in a particular social network can be used to identify additional connections based on that person's connections. Distinct social graphs can include edges connecting one or more social graph to one or more other social graphs. Thus, a social graph can include a single social graph or multiple interconnected social graphs.

Affinity between members of a social graph can be represented by edges, e.g., in a database that stores data for the social graph. These edges can be weighted, either in that database or elsewhere, to reflect a level of affinity between two parties connected in the social graph. Affinity between parties can be content specific. For example, social graph data may identify specific types of content associated with an edge between parties and specific affinities for that content. For example, the social graph data may specify that, between two connected parties, the first party has a first level of affinity for the second party's videos and a second, different level of affinity for the second party's written work. Similarly, the social graph may specify that the second party has a third, different level of affinity for the first party's blogs.

Figure 3:
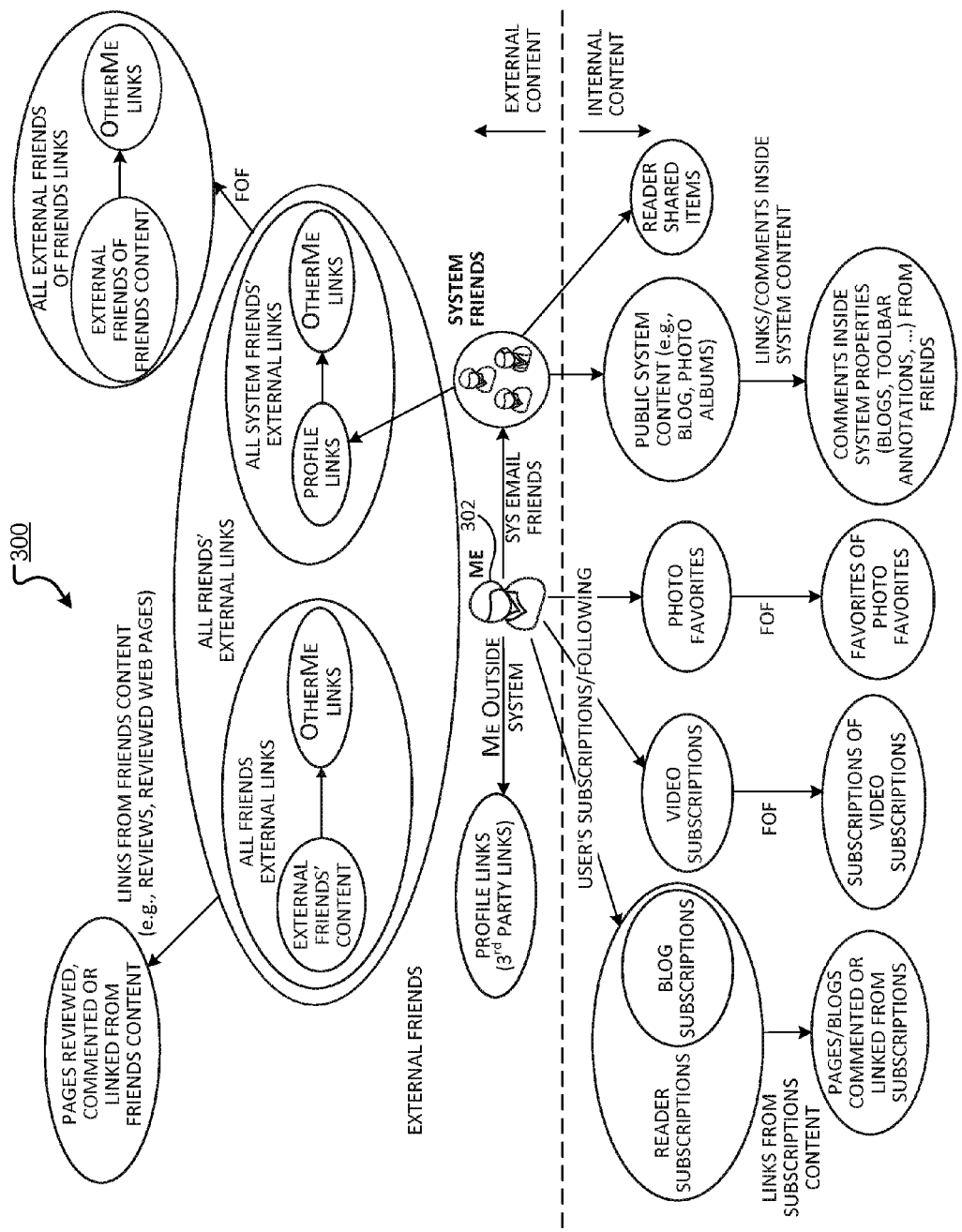
FIG. 3 a conceptual view of an example of a social graph.

FIG. 3 is a conceptual view of an example social graph 300. In this regard, FIG. 3 shows sources of information for a social graph. In this example, the user's social graph is a collection of connections (e.g., users, resources, etc.) identified as having a relationship to the user 302 within some degree of separation. The user's social graph can include people and particular content at different degrees of separation. For example, the social graph of a user can include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

Diagram 300 shows a user 302 and the different connections that are possible to extend the user's social graph to people and content both within a system and across one or more external networks. For example, the user can have a profile or contacts list that includes a set of identified contacts, a set of links to external resources (e.g., Web pages), and subscriptions to content of a system (e.g., a system that provides various content and applications including e-mail, chat, video, photo albums, feeds, or blogs). Likewise, blogs that include links to a user's contacts may be part of the user's social graph. Each of these groups can be connected to other users or resources at another degree of separation from the user. For example, contacts of the user each may have their own profile that includes connections to resources as well as contacts of the respective contacts. In another example, a user may be connected to a social networking account. That social networking account may reference an article in a newspaper. A social connection, therefore, may be established between the user and the author of the article.

In some implementations, the connections to a user within a specified number of degrees of separation can be considered the social graph of the user. Membership and degree of separation in the social graph may be based on other factors, including a frequency of interaction. For example, a frequency of interaction by the user (e.g., how often the user visits a particular social networking site) or type of interaction (e.g., endorsing, selecting, or not selecting items associated with contacts). As interaction changes, the relationship of a particular contact in the social graph can also dynamically change. Thus, the social graph can be dynamic rather than static.

Figure 4:
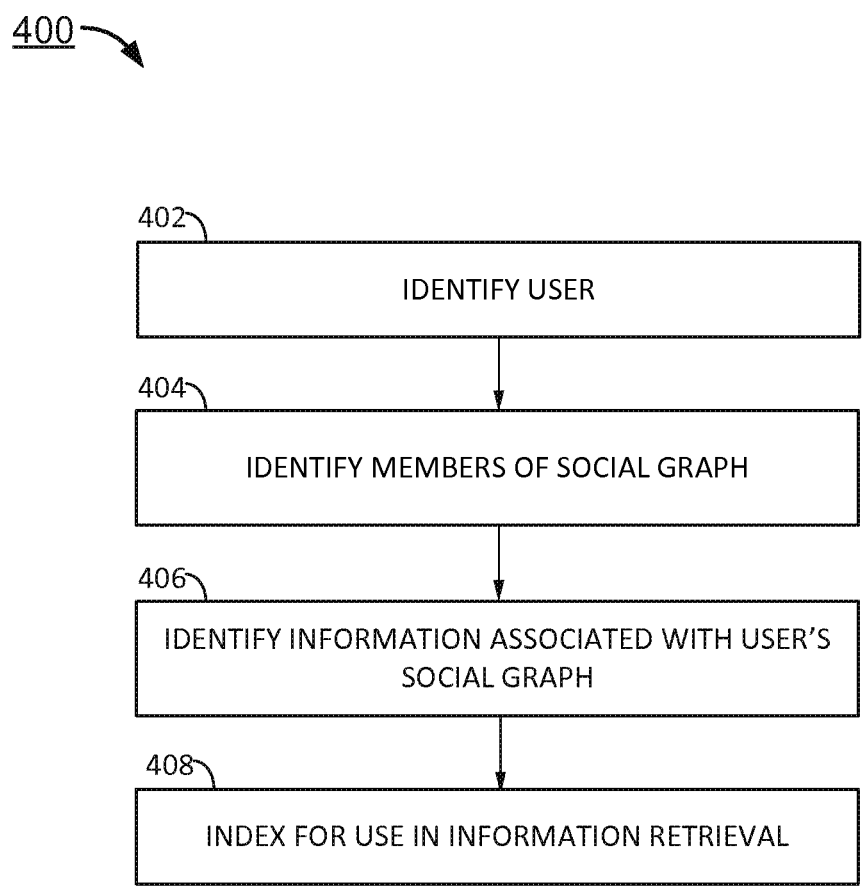
FIG. 4 is a flowchart showing an example of a process for creating and updating social graph information.

FIG. 4 is a flowchart showing an example of a process for creating and updating social graph information. In this regard, FIG. 4 shows a process 400 for determining a user's social graph information. Process 400 may be performed on an on-going basis by a dedicated engine 216 in search system 212, e.g., before, or concurrent with, processes 500, 600, 700, 800, and/or 900 of FIGS. 5 to 9 (described below). In this regard, the information obtained using processes 500, 600, 700, 800, and/or 900 may be available to, and used by, process 400, to update appropriate social graphs.

Process 400 identifies (402) a user. The user can be identified, for example, based on a profile associated with the user. The profile can be accessed, e.g., by referencing a username, email address, or other identifier. This information may be obtained through a login or other appropriate process.

Process 400 obtains information that is used to construct the user's social graph. In this example, the user's social graph identifies contacts and inanimate resources associated with the user, e.g., in which the user an interest. In some implementations, the social graph is limited to a specified number of degrees of separation from the user or to particular relationships or types of interaction with the user. In some implementations, the user's social graph may be generated by another system and provided upon request.

Referring to FIG. 4, process 400 identifies (404) members of the user's social graph. The user's social graph may be constructed using user profile data, e.g., by extracting relevant information from users and resources identified in the user profile data. For example, a user's profile can include a list of the user's contacts. The user's contacts can include contacts within a system (e.g., using a same e-mail or chat service that is affiliated with system) or external to the system (e.g., social graphs or a list of contacts associated with third party applications or service providers). The profile can also include a list of subscriptions to which the user belongs (e.g., identifying content that the user follows, for example, particular blogs or feeds), from which members of the user's social graph can be inferred.

The user's profile can also identify aliases used by the user (e.g., as associated with particular content providers or social graph sources). For example, a user may have a first identity for a chat application and a second identity for a restaurant review Web site. These two identities can be connected in order to unify online content associated with that user.

A user can prevent addition of members to the user's social graph, e.g., using an option or by keeping contacts out of particular groups used by process 400 to generate the social graph. In some implementations, privacy features provide a user with an option to allow or to prevent, respectively, being included (or removed the user if already included) as a member of another's social graph. Thus, users can have control over what personal information or connection information, if existing, is included in their social graphs.

Process 400 identifies (408) information associated with the user's social graph. Identified information associated with the user's social graph can include, for example, content or posting to resources subscribed to by the user (e.g., blogs). The identified information can also include content generated by members of the user's social graph. For example, members of a user's social graph can generate content including, for example, local reviews (e.g., for restaurants or services), video reviews and ratings, product reviews, book reviews, blog comments, news comments, maps, public Web annotations (e.g., endorsements), public documents, streaming updates, photos and photo albums. Thus, the content can include both content generated by members of the user's social graph, and content endorsed, reviewed or annotated by members of the user's social graph. The user's profile can also include external links identified by the user. These links can identify particular content of interest.

The social graph can be expanded by extracting information from identified people and content in the user's profile. For example, public profile information from social networks can exist for identified contacts, from which information can be extracted (e.g., their contacts, links, and subscriptions). In some implementations, the user can adjust the members of their social graph directly. For example, the user can group their contacts (e.g., e-mail contacts) into groups accessed by process 400 in building the user's social graph.

Process 400 indexes (408) the identified social graph information for use in information retrieval. The social graph information may be part of a database in the indexed cache 214 of FIG. 2. By way of example, the index can be searched in response to a received search query to identify relevant search results associated with members of the user's social graph. For example, a search system can receive a query and identify both general search results as well as search results based on the indexed social graph information. In some implementations, the indexed social graph information may be updated intermittently or periodically, for example, to include recently added information associated with the user's social graph. The indexed social information may also be updated, e.g., on an on-going basis to reflect relationships determined in accordance with the processes described herein.

In some implementations, user interests and disinterests can be inferred based on user activity, and the resulting inferred information can be incorporated into a user's online profile or social graph. As an example, a user's search logs or search history can be used to determine which Web pages the user has visited. If, for example, Web histories for the user indicate that the user spent an amount of time on sports-related Websites greater than a threshold amount of time, then an inference can be made that the user is interested in sports. Furthermore, the relative number of sports-related Websites visited and/or the relative amount of time that the user spent on the Web sites can indicate the degree of interest of the user. Conversely, by not visiting politically-related Websites, or by clicking away from such Web sites before the threshold amount of time, an inference can be made that the user is not interested in politics. The author's of the content that the user has accessed, the subjects of that content, or other appropriate features of the content may be incorporated into the user's social graph.

In this regard, search logs and search histories can be anonymized so that the privacy of users is protected. For example, quasi-unique identifiers can be associated with users, but the actual identifying information of the users is not stored in the search logs. Additionally, identified user preferences or user interactions can be generalized (for example, generalized based on user demographics) rather than associated with a particular user. Encryption and obfuscation techniques can also be used to protect the privacy of users.

Figure 5:
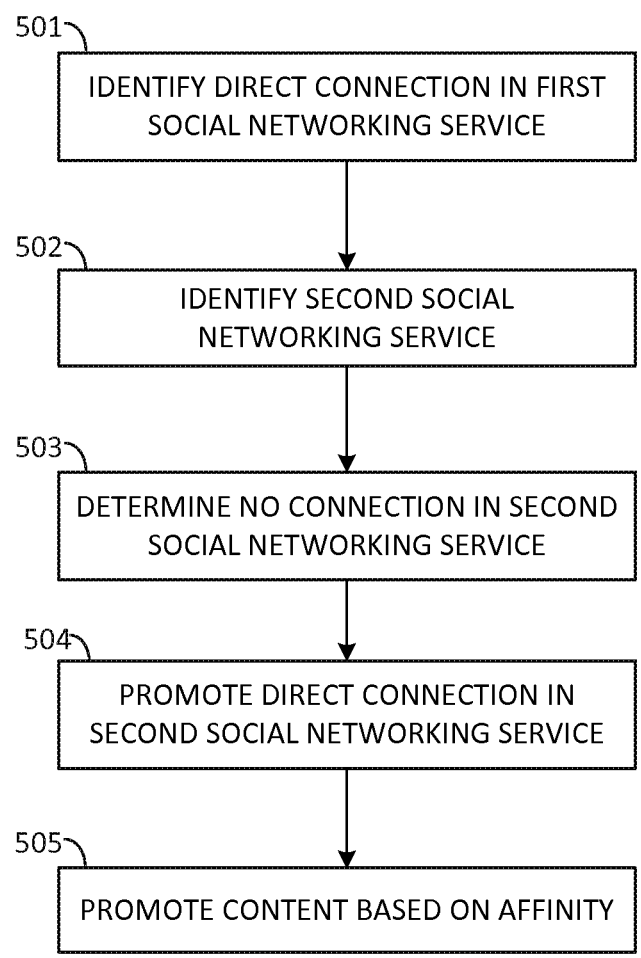
FIGS. 5 to 9 are flowcharts of examples of processes that may be performed on the network environment of FIGS. 1 and 2 and that use using social networking information.

FIGS. 5 to 9 are flowcharts of examples of processes that may be performed on the network environment of FIGS. 1 and 2 and that use using social networking information FIG. 5 shows an example process 500 for using social networking information to promote content and connections. Process 500 may be performed by a dedicated engine 216 in search system 212 or on other appropriate hardware.

Process 500 identifies (501) a direct connection between two parties in a social graph, e.g., a connection that does not include intermediary parties. Process identifies (501) the direct connection by traversing the social graphs of the first and/or second parties until an appropriate edge is found between the two parties. The social graphs may be traversed using the indexed social graph data stored, e.g., in index 214 of FIG. 2. In an example, the direct connection may be a first party connected to a second party on a social network. In another example, the direct connection may be a first party subscribed to a second party's blog. An appropriate social graph connection described above, which is direct, may be identified (501) in this operation. In an example, a direct contact may be a single edge, with no intermediaries, between two parties.

With consent of the first party, second party, and a second social network, process 500 identifies (502) the second social network, to which both the first party and the second party subscribe. The second social network may be identified by traversing the social graphs of the first and second parties until a node thereof is reached that corresponds to the second social network. This second social network is different from the first social network identified (501) above. By traversing the social graphs of the two parties, process 500 also determines (503) that there is no connection between the two parties in the second social network. In this particular example, this means that there is neither a direct connection (e.g., no intermediary parties) nor an indirect connection (e.g., through intermediary parties) between the two parties in the second social network. Provisions may be provided for users to prevent their content from being indexed and searched, in which case, the operations performed here would not be performed on that content. Likewise, authorization may be required for a user's content is accessed.

Since the two parties are connected in the first social network, process 500 attempts to adjust the affinity between the two parties. Process 500 therefore promotes (504) a direct connection between the two parties on the second social network. For example, process 500 may prompt the second social network to suggest that one or both parties' contact, follow, subscribe to content from, etc., the other party. In some implementations, the direct connection requires the assent of one or both parties. Whether the direct connection requires assent may be determined, e.g., based on the parties' settings in their respective social networking accounts.

If a direct connection has been established, process 400 of FIG. 4 may update the parties' social graphs to adjust affinity between the parties, e.g., by adding an edge where none previously existed or by increasing the weight of an existing edge. Process 500 may use this adjusted affinity in an appropriate manner. For example, process 500 may promote (or demote) (505) content between the parties. In an example, content may be promoted simply by sending the content from one party to another in an appropriate electronic communication. In an example, content may be demoted, e.g., by assigning that content a ranking score below other content not associated with the connected party.

In another example, in a search context, process 500 may promote future search results associated with the parties over search results not associated with parties (e.g., searches of Web pages or other resources 205). For the first party, for example, process 500 may rank future search results associated with the second party as being more relevant than search results not associated with the second party. For the second party, for example, process 500 may rank future search results associated with the first party as being more relevant than search results not associated with the first party. When ranking the search results, process 500 may also take into account the relevance of a party's content to search terms provided in an initial search query. Ranking of search results can also be affected by other factors, e.g., an information retrieval score of social graph content relative to the submitted query (e.g., relevance of the social graph content), content type (e.g., blogs versus images), and the date of the associated content.

Search results presented by process 500 are thus customized based on a user's social graph. So, the same search query may produce search results for different parties, depending upon the contents of their social graphs.

Promoting and demoting content is not limited to ranking search results, but rather may be used to rank content provided to one or both of the parties. For example, ranking of items in a content stream may be influenced by an affinity established or modified by process 500. In this context, a content stream may include appropriate electronic (e.g., Web-based) content, examples of which include messages, links, images, and the like that is provided by a service for display to a user.

Process 500 may provide the parties with options to further adjust their online social connection. For example, process 500 may suggest that the parties connect through yet another social network, which would result in an additional edge on the parties' social graphs. Process 500 may suggest that one party subscribe to a blog by the other party. Other appropriate suggestions may be made to adjust the online social connection.

Figure 6:
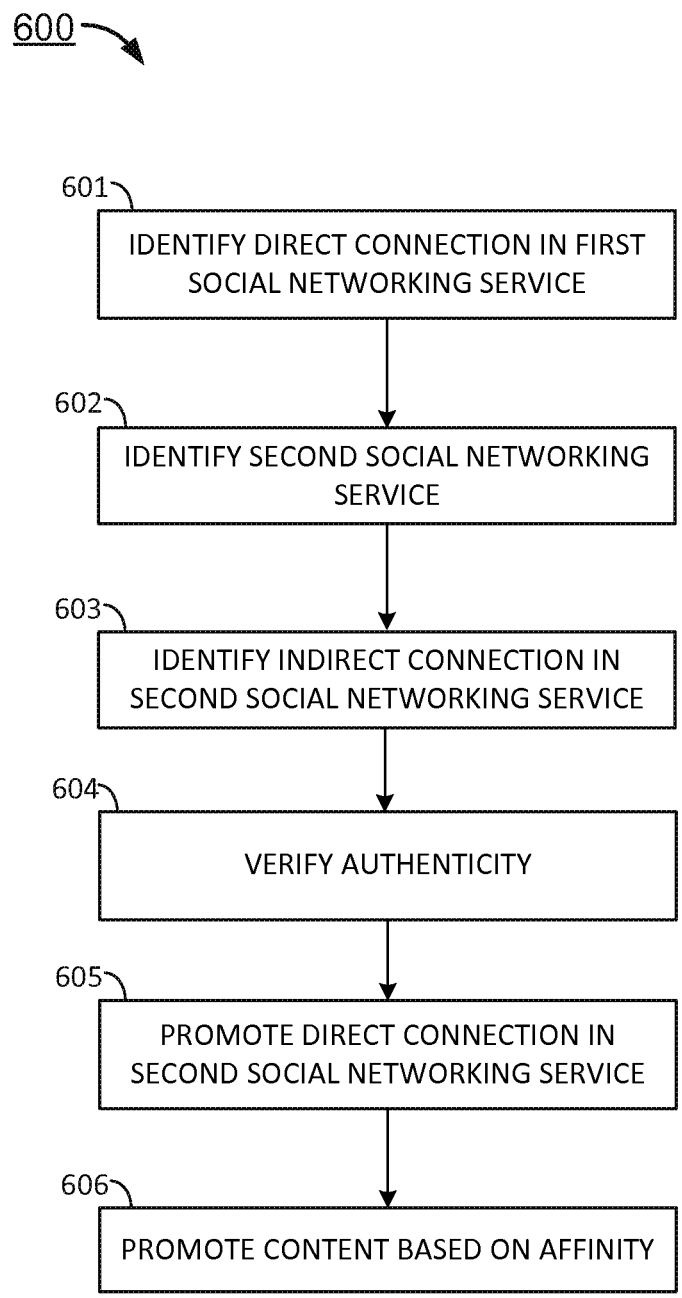

FIG. 6 shows another example process 600 for using social networking information. Process 600 may be performed by a dedicated engine 216 in search system 212 or on other appropriate hardware.

Process 600 identifies (601) a direct connection in a social graph between two parties. As above, in this context, a direct connection does not include intermediary parties. The process for identifying (601) a direct connection may be similar to that performed (501) in process 500 of FIG. 5.

With consent of the first party, second party, and a second social network, process 600 identifies (602) a second social network, to which both the first party and the second party subscribe. The process for identifying the second social network may be similar to that performed (502) in process 500 of FIG. 5. As was the case in process 500, this second social network is different from the first social network. In this case, however, unlike in process 600, there is an indirect connection between the two parties in the second social network. In this particular example, this means that there is a connection between the first and second parties through at least one intermediary party. An intermediary party may be an actual person in the social graph, or it may be an appropriate resource in the social graph. Process identifies (603) the indirect connection by traversing the social graphs of the first and/or second parties until appropriate edges are found between the two parties.

Prior to actually promoting a direct connection between the two parties, process 600 may verify the authenticity (604) of one or both of the parties. More specifically, members of social networks may claim to be people who they are not. For example, a member may impersonate a celebrity or a celebrity moniker. Accordingly, prior to promoting a direct connection, process 600 confirms, to a degree of certainty, that the parties are who they say they are. For example, process 600 may request and receive username and password information from both parties. In another example, process 600 examines connections on the social graphs of the parties. If the parties have a number of common connections (e.g., if the number of common connections exceeds a threshold), process may determine that the identities of the two parties are verified. The quality of the connections in this process may be examined as well. Authentication processes, including those described herein, may be incorporated into an appropriate part of each of processes 400, 500, 600, 700, 800 and 900 described herein.

After process 600 verifies the authenticity of the parties, process 600 may promote (605) a direct connection between the parties in the second social network. In this regard, if process 600 is promoting, to a first party, connection to a second party, then, in some implementations, only the second party's identity need be verified (since no promotion to the second party is taking place). Conversely, in some implementations, if process 600 is promoting, to the second party, connection to the first party, then only the first party's identity need be verified (since no promotion to the first party is taking place). If process 600 is promoting connection to both parties, e.g., for the first party to connect socially to the second party and the second party to connect social to the first party, then both parties may need to be authenticated. The process for promoting (605) a direct connection may be similar to that performed (504) in process 500 of FIG. 5. The features described with respect to promoting (504) a direct connection in process 500 may apply to process 600.

If a direct connection has been established, process 400 of FIG. 4 may update the parties' social graphs information to reflect the adjustment in their affinity. Process 600 may use this modified affinity in an appropriate manner. For example, process 600 may promote (606) content between parties. The process for promoting (606) content may be similar to that performed (505) in process 500 of FIG. 5. The features described with respect to promoting (505) content in process 500 may apply to process 600.

FIGS. 5 and 6 describe implementations where a direct connection (e.g., a single edge) is identified between two parties in a first social network. However, in other implementations of the processes of FIGS. 5 and 6, an indirect connection may be identified in the first social network, and that indirect connection may be used to promote a connection on the second social network or a closer connection (e.g., a fewer number of nodes between parties) than that which currently exists on the second social network. In these implementations, for example, content from such indirect connections may be promoted to one or both of the first and second parties in manners similar to that described above with respect to FIGS. 5 and 6.

Figure 7:
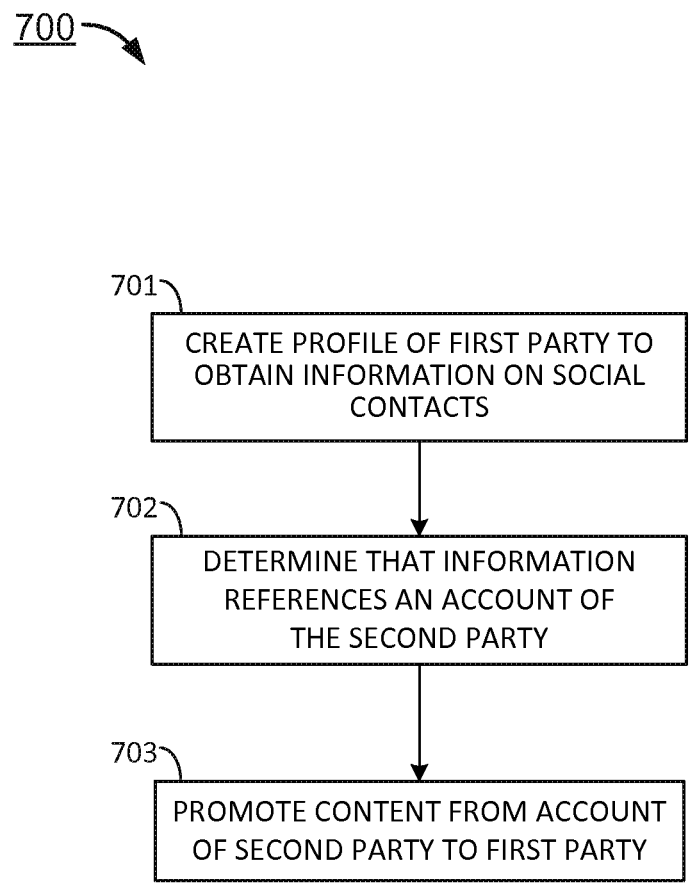

FIG. 7 shows another example process 700 for using social networking information. Process 700 may be performed by a dedicated engine 216 in search system 212 or on other appropriate hardware.

Process 700 uses contact information from a party's profile to enhance social affinity and to promote online content. To this end, process 700 obtains a profile for a party, which will be referred to as "the user". Access to user profiles may only be granted with permission from the profile's owner. The profile may include, e.g., identified contacts, contact information for those contacts, links to external resources (e.g., Web pages), and subscriptions to content of a system (e.g., a system that provides various content and applications including e-mail, chat, video, photo albums, feeds, or blogs). Included in the contact information is an identifier for a second party, which will be referred to as the user's contact. The identifier may be a name, handle, username, or other moniker for an account in a social network to which the contact subscribes, but to which the user need not subscribe.

With the user's permission, for example, process 700 crawls (701) the user's profile to obtain information relating to the user's social contacts (e.g., contacts). Alternatively, this information may be obtained by referencing the social graph information contained in index 214. Process 700 determines (702) that this information from the profile includes contact information for an account on a social network to which the user's contact subscribes. For example, as noted above, the contact information may be an account name, handle, username, or other moniker. Process 400 of FIG. 4 uses this information to update the parties' social graphs to reflect an adjustment to their affinity. Process 700 also uses this information to promote (703) content from the account of the social network to the user. The process for promoting (703) content may be similar to that performed (505) in process 500 of FIG. 5. The features described with respect to promoting (505) content in process 500 may apply to process 700.

Process 700 may also promote a direct connection between the two parties on a social network. The process for promoting a direct connection may be similar to that performed (504) in process 500 of FIG. 5. The features described with respect to promoting (504) the direct connection in process 500 may apply to process 700.

Figure 8:
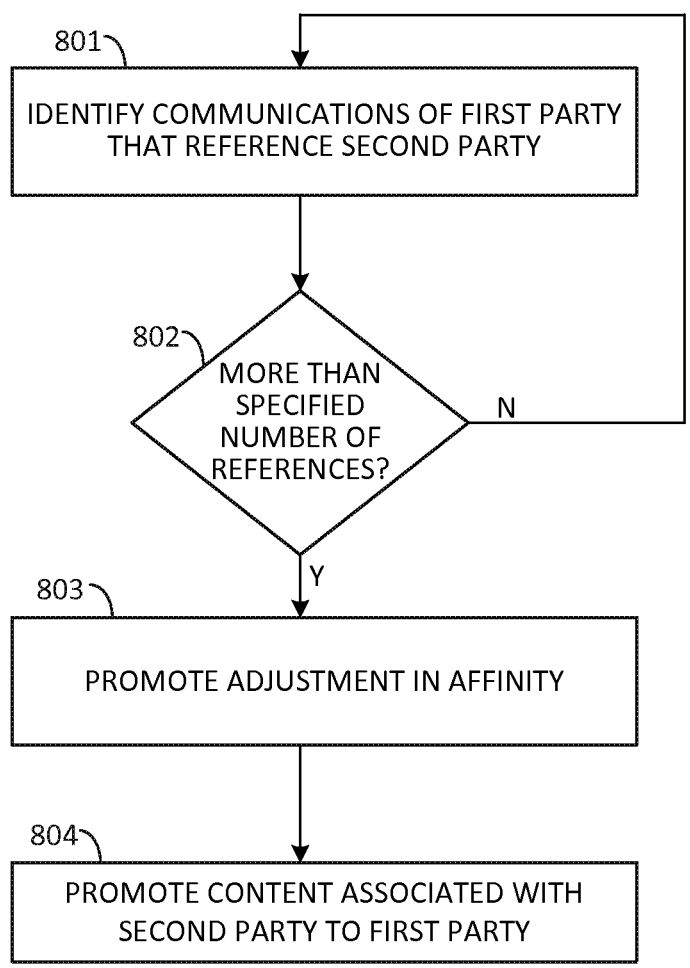

FIG. 8 shows another example process 800 for using social networking information. Process 800 may be performed by a dedicated engine 216 in search system 212 or on other appropriate hardware.

Process 800 identifies references to parties in electronic communications (e.g., through a social network), and uses that information as described below. In this example, process 800 identifies (801) communications of a first party that reference a second party. The communications may be located, e.g., by searching an index of the parties' social graph information (e.g., with the parties' permission). The communications may be appropriate electronic communications, examples of which include e-mail messages, text messages, tweets, posts, blogs, or the like. The references may be references by name or alias to the second party, references to content associated with the second party, references to accounts of the second party, or other appropriate references that can be used to identify a party (e.g., from an index). Process 800 analyzes the communications to identify the references. For example, process 800 may parse text, images or the like from the communications, and analyze that information to identify the relevant party reference(s).

Process 800 determines (802) whether the number of references to the second party in the first party's communications exceed a threshold. The references may be, e.g., in the body of the communication, in the subject line of the communication, in the address line of the communication, or elsewhere in the communication. The threshold may be predefined or it may be set on a case-by-case basis. If the number of references to the second party in the first party's communications does not exceed the threshold, analysis of the communications may continue. If, however, the number of references to the second party in the first party's communications exceeds the threshold, process 800 promotes (803) an adjustment in affinity between the first and second parties in one or both of the parties' social graphs. To this end, promotion of the adjustment in affinity may include suggesting that the two parties establish a direct connection through a social network. For example, process 800 may determine, based on the parties' social graphs, that both parties subscribe to the same social network, but that the parties are not directly connected in that social network. References in communications by one party to another may provide the impetus, as described above, for suggesting that the two connect.

Regardless of whether a direct connection is established, process 400 of FIG. 4 may be used to update the parties' social graphs information to reflect an adjustment in their affinity. If a direct connection is established, a stronger affinity may be reflected in the appropriate social graph. Process 800 may use this affinity in an appropriate manner. For example, process 800 may promote (804) content between parties. The process for promoting (804) content may be similar to that performed (505) in process 500 of FIG. 5. The features described with respect to promoting (505) content in process 500 may apply to process 800.

Figure 9:
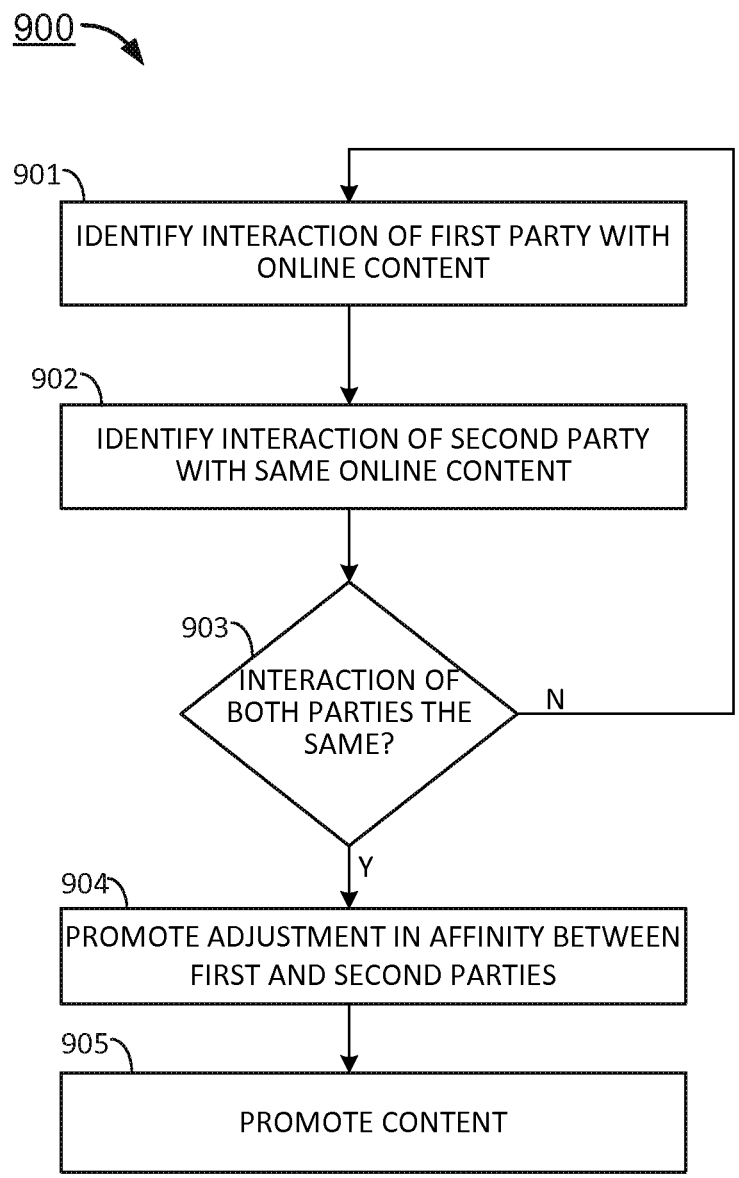

FIG. 9 shows another example process 900 for using social networking information. Process 900 may be performed by a dedicated engine 216 in search system 212 or on other appropriate hardware.

Process 900 infers that two parties have a common interest based on their interactions with online content, and uses that information accordingly. In this example, process 900 identifies (901 and 902) interaction two parties have with the same online content. The types of interactions may be obtained, e.g., by searching an index of the parties' social graph information. For example, process 900 may learn that both parties have endorsed the same online content, that both parties have shared the same online content, that both parties have recommended the same online content, and/or that both parties have commented on the same online content. Process 900 determines (903) if the interactions of both parties with the online content is substantially the same. For example, if both parties have provided the same endorsement of the online content, process 900 decides that the two interactions are the same. In some implementations, the exact same interaction may not be required, but rather only an interaction that is similar. For example, an interaction may be deemed to be the same if one party strongly recommends online content and another party only recommends (i.e., not "strongly" recommends) that same online content. Here, positive (or other similar) connotations are sufficient to indicate sameness of the relevant interactions.

If process 900 does not deem (903) the interaction to be the same, the analysis continues. However, if process 900 deems (903) the interaction to be the same, process 900 concludes that the two parties have a common interest and, therefore, have an affinity. Process 400 of FIG. 4 may be used to update the parties' social graphs to reflect this affinity.

Process 900 promotes (904) an adjustment in affinity, e.g., a direct connection between the two parties on a social network, to which both parties may, or may not, be previously connected. The process for promoting (904) such a connection may be similar to that performed (504) in process 500 of FIG. 5. The features described with respect to promoting (504) the direct connection in process 500 may apply to process 900.

Process 900 also promotes (905) content between the parties. The process for promoting content may be similar to that performed (505) in process 500 of FIG. 5. The features described with respect to promoting (505) content in process 500 may apply to process 900.

In some cases, process 900 may determine that a first party has an interest in only certain content, or aspects thereof, provided by a second party. Process 900 may, in these instances, promote, to the first party, only content associated with second party that includes the relevant subject matter. For example, process 900 may rank, in a search results set, content directed to that subject matter as being more relevant than content from that same party not directed to that subject matter. For example, process 900 may rank content directed to the second party's posts about cooking as being more relevant, in a search results list, than, e.g., that party's posts about the Red Sox. As was the case above, ranking of search results in these instances can also be affected by other factors, e.g., an information retrieval score of social graph content relative to the submitted query (e.g., relevance of the social graph content), content type (e.g., blogs versus images), and the date of the associated content. To the extent applicable, this feature of process 900 may be incorporated into the other processes 500, 600, 700 and 800 described herein.

In other examples, if a first party is a contact of a second party on a first social network, and if both the first and second parties are on a second social network (but not connected), a connection may be promoted on the second social network between the first and second parties. For example, the second social network may be instructed to issue an invitation for the second party to become a contact of the first party on the second social network.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Also, in the processes, the authenticity of an account may be verified before a connection based on that account is promoted, or before content from that account is promoted. A method of verification includes requiring the owner of an account to enter their username and password. If the username and password are validated by the corresponding service, then the account may be deemed authentic; that is, the user that the process thinks owns the account does own the account.

Other methods of verifying, or at least inferring, authenticity may be used. For example, the processes can determine whether an account is claimed by more than one user of a corresponding social networking (or other) service.

More specifically, different accounts may be connected to usernames that are the same or similar. If a username is connected to only one account in a social network, the corresponding process may infer that that account is authentic.

In another example, if usernames on two different social networks are similar, and they are determined to be connected to the same user, then the authenticity of the account(s) is deemed verified.

In another example method of verification, reciprocal connections may be identified. For example, a first party may connect to a second party on a first social network, and the second party may connect to the first party on a second, different social network. In some examples, the reciprocal connections are of the same type (e.g., direct). Given this reciprocity of the connections, the processes may infer that the accounts on both services are authentic.

In another example, a reciprocal connection may include an account of a user on a first social network connected to that same user's account on a second social network (or at least an account having the same username or a similar username (e.g., a username within one or two characters). That user's account on the second social network may be connected back to that user's account on the first social network. In this example, the connection constitutes an inference that both accounts and users are authentic. In another such example, the user's account on first social network may be connected to the user's account on a second social network, which may be connected to the user's account on a third social network, which may connect back to the user's account on the first social network. Appropriate reciprocal connections may be used to verify account and user authenticity.

The foregoing methods of verifying account authenticity may be used, either alone or in an appropriate combination with the above processes.

Figure 10:
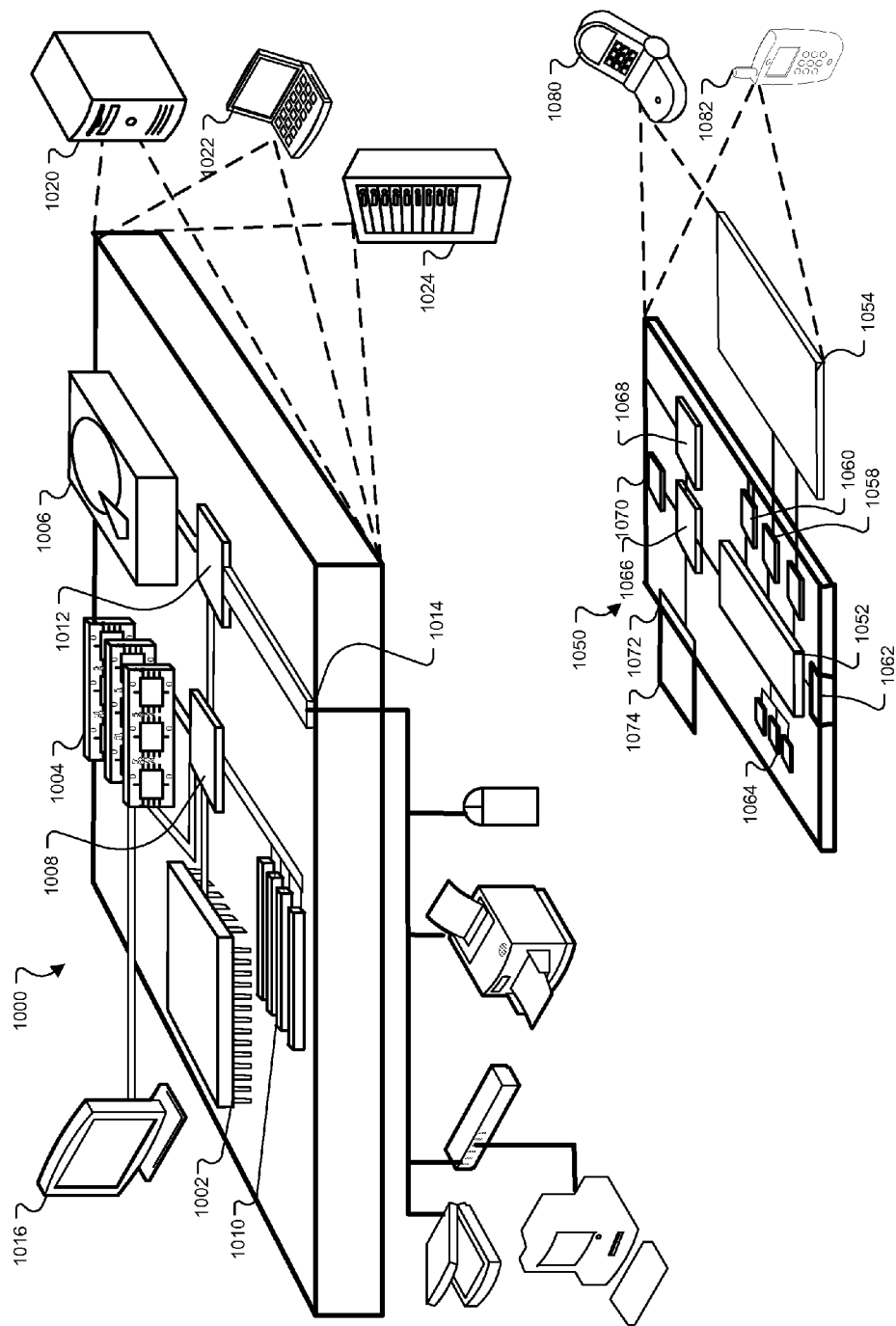
FIG. 10 shows examples of computing devices on which the processes described herein, or portions thereof, may be implemented.

FIG. 10 shows examples of computing devices on which the processes described herein, or portions thereof, may be implemented. In this regard, FIG. 10 shows an example of a generic computing device 1000 and a generic mobile computing device 1050, which may be used to implement the processes described herein, or portions thereof. For example, search system 212 may be implemented on computing device 1000. Mobile computing device 1050 may represent a client device of FIG. 1. Other client devices of FIG. 1 may also have the architecture of computing device 1000.

Computing device 1000 is intended to represent various forms of digital computers, examples of which include laptops, desktops, workstations, personal digital assistants, servers, blade servers, mainframes, and other appropriate computers. Computing device 1050 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, for example, display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, examples of which include a magnetic or optical disk.

The storage device 1006 is capable of providing mass storage for the computing device 1000. In one implementation, the storage device 1006 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 1004, the storage device 1006, or memory on processor 1002. For example, the information carrier may be a non-transitory, machine-readable storage medium.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer, e.g., a laptop computer 1022. Alternatively, components from computing device 1000 may be combined with other components in a mobile device (not shown), e.g., device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device, e.g. a display 1054, a communication interface 1066, and a transceiver 1068, among other components. The device 1050 may also be provided with a storage device, e.g., a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, e.g., control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, e.g., using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, e.g., through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

For situations in which the systems and techniques discussed herein collect personal information about users, the users may be provided with an opportunity to enable/disable programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:

1. A method performed by one or more processing devices, comprising:
    determining that content authored by a first party references a second party more than a specified number of times, the first party and the second party both subscribing to a first and a second social network;
    identifying a first social graph associated with the first party and a second social graph associated with the second party;
    determining, based on the first and the second social graphs, that the first party and the second party are indirectly connected through at least one intermediary party in the first social network and not directly connected through the second social network;
    in response to i) determining that the content authored by the first party references the second party more than the specified number of times and ii) determining that the first party and the second party are indirectly connected through the at least one intermediary party in the first social network and not directly connected through the second social network, suggesting the second party as a connection to the first party through the second social network by modifying one or more attributes of one or more edges in the first social graph to create, in the first social graph, a connection between the first party and the second party in the second social network; and
    in response to the modifying, adjusting promotion, to the first party, of additional content in the second social network that is associated with the second party.

2. The method of claim 1, wherein the additional content comprises content from a social networking account of the second party; and
    wherein adjusting the promotion of the additional content comprises:
        in response to a search query provided by the first party, ranking search results associated with the additional content from the social networking account of the second party as having more relevance than search results not associated with the additional content from the social networking account of the second party.

3. The method of claim 1,
    wherein modifying the one or more attributes comprises changing a weight on one or more edges of the first social graph.

4. The method of claim 1,
    wherein modifying the one or more attributes comprises adding one or more edges to the first social graph, the one or more edges being between the first party and the second party.

5. The method of claim 1, further comprising verifying that the second party is authentic prior to adjusting promotion of the additional content.

6. The method of claim 5, wherein verifying that the second party is authentic comprises:
    identifying contacts that the first party and the second party have in common;
    wherein the second party is deemed authentic if a number of the contacts exceeds a threshold.

7. The method of claim 5, wherein verifying that the second party is authentic comprises:
    identifying reciprocal connections among accounts of the second party on different social networks.

8. The method of claim 1, wherein suggesting the second party as a connection is based on a determination that the first party and the second party have a common interest based on interaction of the first party and of the second party with same online content.

9. The method of claim 1, wherein determining that content authored by the first party references the second party more than the specified number of times further comprises determining that the content authored by the first party identifies the second party more than the specified number of times.

10. One or more non-transitory machine-readable media comprising instructions that are executable to perform operations comprising:
    determining that content authored by a first party references a second party more than a specified number of times, the first party and the second party both subscribing to a first and a second social network;

identifying a first social graph associated with the first party and a second social graph associated with the second party;

determining, based on the first and the second social graphs, that the first party and the second party are indirectly connected through at least one intermediary party in the first social network and not directly connected through the second social network;

in response to i) determining that the content authored by the first party references the second party more than the specified number of times and ii) determining that the first party and the second party are indirectly connected through the at least one intermediary party in the first social network and not directly connected through the second social network, suggesting the second party as a connection to the first party through the second social network by modifying one or more attributes of one or more edges in the first social graph to create, in the first social graph, a connection between the first party and the second party in the second social network; and in response to the adjustment in the affinity, adjusting promotion, to the first party, of additional content in the second social network that is associated with the second party.

11. The one or more non-transitory machine-readable media of claim 10, wherein the additional content comprises content from a social networking account of the second party; and wherein adjusting the promotion of the additional content comprises:

in response to a search query provided by the first party, ranking search results associated with the additional content from the social networking account of the second party as having more relevance than search results not associated with the additional content from the social networking account of the second party.

12. The one or more non-transitory machine-readable media of claim 10, wherein modifying the one or more attributes comprises changing a weight on one or more edges of the first social graph.

13. The one or more non-transitory machine-readable media of claim 10, wherein modifying the one or more attributes in affinity comprises adding one or more edges to the first social graph, the one or more edges being between the first party and the second party.

14. The one or more non-transitory machine-readable media of claim 10, wherein the operations comprise verifying that the second party is authentic prior to adjusting promotion of the additional content.

15. The one or more non-transitory machine-readable media of claim 14, wherein verifying that the second party is authentic comprises:

identifying contacts that the first party and the second party have in common;

wherein the second party is deemed authentic if a number of the contacts exceeds a threshold.

16. The one or more non-transitory machine-readable media of claim 14, wherein verifying that the second party is authentic comprises:

identifying reciprocal connections among accounts of the second party on different social networks.

17. A system comprising:

one or more processors;

memory storing instructions that are executable;

an indexing engine stored by the memory, the indexing engine operable when executed with the one or more processors to generate a search index containing information from one or more social graphs corresponding to one or more social networks; and a search engine stored by the memory, the search engine operable when execute with the one or more processors to perform operations comprising:

determining that content authored by a first party references a second party more than a specified number of times, the first party and the second party both subscribing to a first and a second social network;

identifying a first social graph associated with the first party and a second social graph associated with the second party;

determining, based on the first and the second social graphs, that the first party and the second party are indirectly connected through at least one intermediary party in the first social network and not directly connected through the second social network;

in response to i) determining that the content authored by the first party references the second party more than the specified number of times and ii) determining that the first party and the second party are indirectly connected through the at least one intermediary party in the first social network and not directly connected through the second social network, suggesting the second party as a connection to the first party through the second social network by modifying one or more attributes of one or more edges in the first social graph to create, in the first social graph, a connection between the first party and the second party in the second social network; and in response to the adjustment in the affinity, adjusting promotion, to the first party, of additional content in the second social network that is associated with the second party.

* * * * *